(12) United States Patent
Nakashima

(10) Patent No.: US 8,929,452 B2
(45) Date of Patent: Jan. 6, 2015

(54) IMAGE PROCESSING APPARATUS, IMAGE CAPTURING APPARATUS, AND COMPUTER PROGRAM

(71) Applicant: Panasonic Corporation, Osaka (JP)

(72) Inventor: Toshiyuki Nakashima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 13/738,042

(22) Filed: Jan. 10, 2013

(65) Prior Publication Data
US 2013/0176487 A1   Jul. 11, 2013

(30) Foreign Application Priority Data
Jan. 11, 2012   (JP) ................................. 2012-002733

(51) Int. Cl.
| | |
|---|---|
| H04N 7/12 | (2006.01) |
| H04N 11/02 | (2006.01) |
| H04N 11/04 | (2006.01) |
| H04N 5/228 | (2006.01) |
| G06K 9/00 | (2006.01) |
| H04N 7/01 | (2006.01) |
| G06T 3/40 | (2006.01) |
| G06T 7/20 | (2006.01) |
| G06T 7/40 | (2006.01) |

(52) U.S. Cl.
CPC .............. *H04N 7/014* (2013.01); *G06T 3/4007* (2013.01); *G06T 7/2013* (2013.01); *G06T 7/401* (2013.01); *H04N 7/0132* (2013.01); *G06T 2207/20021* (2013.01)
USPC .............. 375/240.16; 348/222.1; 375/240.12; 382/107; 382/181

(58) Field of Classification Search
USPC .............. 348/222.1, 231.99–231.9, 234–239, 348/208.99–208.16, 333.01–333.13, 348/441–459; 375/240–240.16; 382/103, 382/107, 162–167, 181–231
See application file for complete search history.

(56) References Cited

U.S. PATENT DOCUMENTS

| | | | | |
|---|---|---|---|---|
| 4,992,869 | A | * | 2/1991 | Samad et al. .................. 348/451 |
| 5,905,527 | A | * | 5/1999 | Inou et al. ................. 348/207.99 |
| 6,192,079 | B1 | * | 2/2001 | Sharma et al. ........... 375/240.16 |
| 6,900,846 | B2 | * | 5/2005 | Lee et al. ....................... 348/459 |

(Continued)

FOREIGN PATENT DOCUMENTS

| | | |
|---|---|---|
| JP | 2007-235403 A | 9/2007 |
| JP | 2009-290802 A | 12/2009 |
| JP | 2010-177739 A | 8/2010 |

OTHER PUBLICATIONS

Co-pending U.S. Appl. No. 13/738,069, filed Jan. 10, 2013.

(Continued)

*Primary Examiner* — Michael Osinski
(74) *Attorney, Agent, or Firm* — Renner, Otto, Boisselle & Sklar, LLP

(57) ABSTRACT

An image processing section includes: a repetitive pattern detection section for detecting whether a repetitive pattern is present in at least one of first and second frames; a motion vector calculation section for calculating a motion vector by performing a matching operation between the first and second frames within a search range determined based on a detection result from the repetitive pattern detection section; and an interpolation image generating section for generating an interpolation frame in accordance with a calculation result of the motion vector.

9 Claims, 7 Drawing Sheets

(56) References Cited

U.S. PATENT DOCUMENTS

| | | | |
|---|---|---|---|
| 8,184,703 B2* | 5/2012 | Hamakawa et al. | 375/240.16 |
| 8,411,751 B2* | 4/2013 | Albuz et al. | 375/240.16 |
| 8,432,973 B2* | 4/2013 | Yamasaki et al. | 375/240.16 |
| 8,531,600 B2* | 9/2013 | Koizumi et al. | 348/441 |
| 2003/0086498 A1* | 5/2003 | Lee et al. | 375/240.16 |
| 2004/0005004 A1* | 1/2004 | Demos | 375/240.08 |
| 2004/0227851 A1* | 11/2004 | Min | 348/441 |
| 2004/0240551 A1* | 12/2004 | Itoh et al. | 375/240.16 |
| 2005/0025342 A1* | 2/2005 | Lee et al. | 382/107 |
| 2006/0222077 A1* | 10/2006 | Ohwaki et al. | 375/240.16 |
| 2006/0262853 A1* | 11/2006 | Li et al. | 375/240.16 |
| 2007/0110161 A1* | 5/2007 | Saigo et al. | 375/240.16 |
| 2007/0140346 A1* | 6/2007 | Chen et al. | 375/240.16 |
| 2008/0123743 A1* | 5/2008 | Douniwa et al. | 375/240.15 |
| 2008/0211968 A1* | 9/2008 | Murakami et al. | 348/699 |
| 2009/0059065 A1* | 3/2009 | Yamasaki | 348/441 |
| 2009/0073311 A1* | 3/2009 | Hamada et al. | 348/441 |
| 2009/0316789 A1* | 12/2009 | Sasai et al. | 375/240.16 |
| 2011/0141349 A1* | 6/2011 | Albuz et al. | 348/441 |
| 2012/0008689 A1* | 1/2012 | Nasu et al. | 375/240.16 |
| 2012/0154675 A1* | 6/2012 | Nasu et al. | 348/452 |
| 2012/0308137 A1* | 12/2012 | Hamasaki | 382/181 |
| 2013/0176447 A1* | 7/2013 | Nakashima | 348/208.4 |
| 2013/0176460 A1* | 7/2013 | Nakashima | 348/231.99 |
| 2013/0176488 A1* | 7/2013 | Nakashima | 348/452 |
| 2013/0177080 A1* | 7/2013 | Nakashima et al. | 375/240.14 |

OTHER PUBLICATIONS

Co-pending U.S. Appl. No. 13/738,132, filed Jan. 10, 2013.

\* cited by examiner

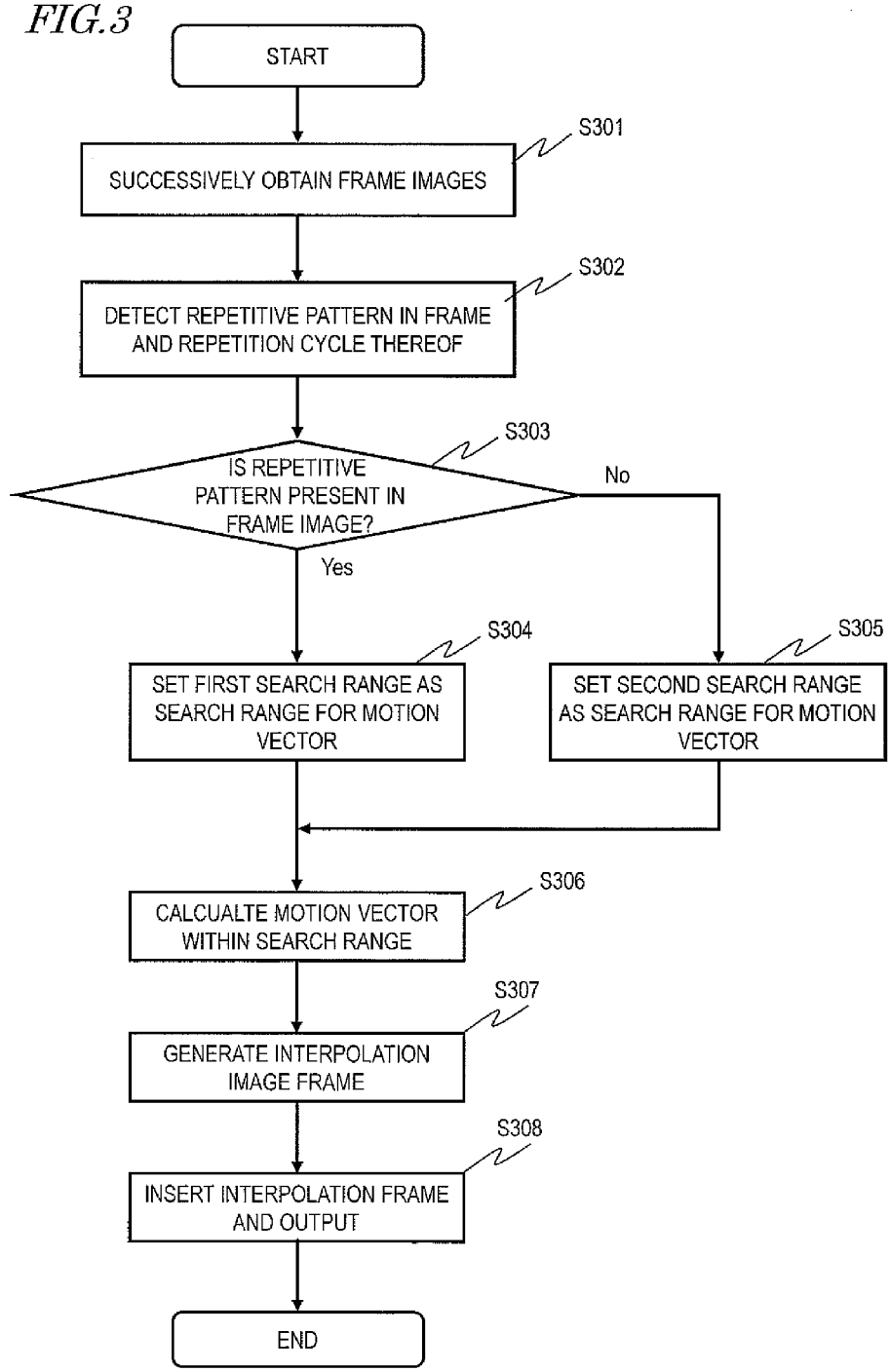

IMAGE PROCESSING APPARATUS, IMAGE CAPTURING APPARATUS, AND COMPUTER PROGRAM

BACKGROUND

1. Technical Field

The present disclosure relates to an image processing apparatus capable of converting a frame rate of a moving picture obtained through a shooting.

2. Description of the Related Art

Japanese Laid-Open Patent Publication No. 2010-177739 discloses an image processing apparatus. The image processing apparatus generates interpolation frame images to be inserted between frame images. The image processing apparatus of Japanese Laid-Open Patent Publication No. 2010-177739 calculates the search area for a motion vector of an interpolation pixel included in an interpolation frame image based on a change in the pixel value within each frame of a plurality of frame images, and generates an interpolation frame image based on a motion vector estimated in the calculated search area.

SUMMARY

Where an interpolation frame is generated using a motion vector, if an object having a repetitive pattern, such as a fence or a lattice, is present in the image, it is highly likely that the motion vector is calculated erroneously, failing to obtain an appropriate interpolation frame.

The present disclosure provides an image processing technique capable of generating a more appropriate interpolation frame even if an object having a repetitive pattern is present in a moving picture.

An image processing apparatus according to an embodiment of the present disclosure generates an interpolation frame to be inserted between a first frame and a second frame of a moving picture contiguous with each other. The image processing apparatus includes: a repetitive pattern detection section for detecting whether a repetitive pattern is present in at least one of the first and second frames; a motion vector calculation section for calculating a motion vector by performing a matching operation between the first and second frames within a search range determined based on a detection result from the repetitive pattern detection section; and an interpolation frame generation section for generating the interpolation frame in accordance with a calculation result of the motion vector.

With the technique of the present disclosure, it is possible to generate a more appropriate interpolation frame even if an object having a repetitive pattern is present in a moving picture.

BRIEF DESCRIPTION OF THE DRAWINGS

FIG. 3 is a flow chart showing an operation performed by the image processing section of the digital video camera according to example Embodiment 1.

DETAILED DESCRIPTION

Figure 1:
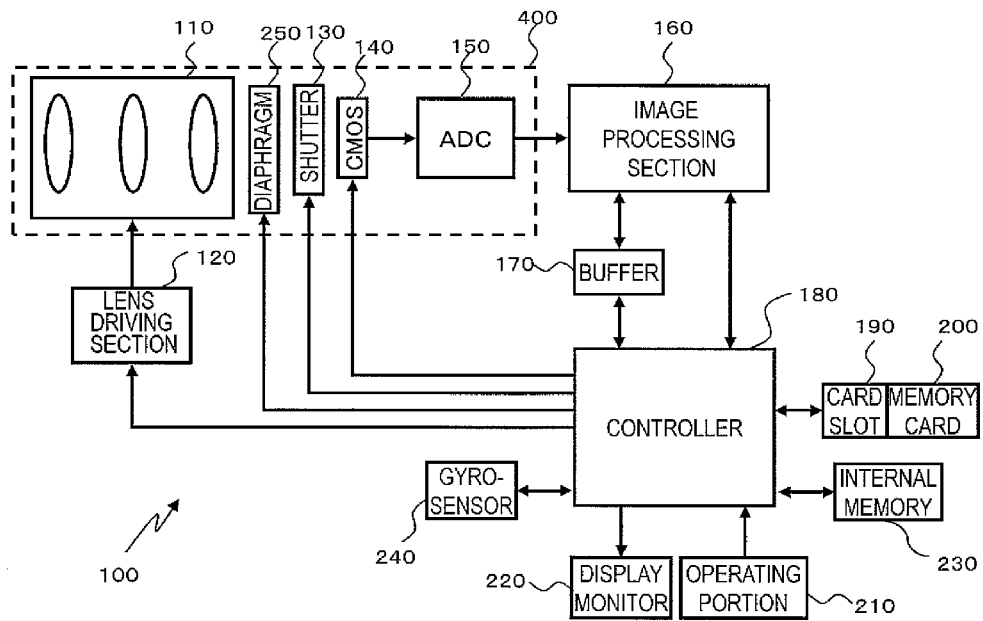
FIG. 1 is a block diagram showing a configuration of a digital video camera according to example Embodiment 1.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventor provide the accompanying drawings and the following description in order for a person of ordinary skill in the art to sufficiently understand the present disclosure, and they are not intended to limit the subject matter set forth in the claims.

(Embodiment 1)

Embodiment 1, in which the technique of the present disclosure is applied to a digital video camera, will now be described with reference to the drawings. In the following description, data representing each of the individual still images of a moving picture will be referred to a "frame image" or simply a "frame". A frame to be inserted between two contiguous frames will be referred to as an "interpolation frame image" or simply an "interpolation frame".

[1-1. Outline]

A digital video camera 100 of the present embodiment is an image capturing apparatus capable of capturing a moving picture. The digital video camera 100 of the present embodiment is capable of converting a frame rate during or after the operation of capturing a moving picture. The digital video camera 100 of the present embodiment changes the frame rate by inserting an interpolation frame image between contiguous frame images obtained through a shooting. For example, when performing a movie capturing operation at 60 frames per second, the operation can be switched to a movie capturing operation at 120 frame per second by inserting interpolation frame images between frames. The time when the digital video camera 100 switches frame rates from one to another may be when a user gives an instruction to change the frame rate, when information (e.g., brightness information)

obtained from an image captured through a shooting (hereinafter referred to as a "captured image".) is changed, or when a predetermined mode (e.g., a low-speed image capturing mode) is selected.

A configuration and an operation of a digital camera 100 according to the present embodiment will now be described with reference to the drawings.

[1-2. Configuration of Digital Video Camera]

First, a configuration of a digital video camera according to the present embodiment will be described with reference to FIG. 1. FIG. 1 is a block diagram showing a configuration of the digital video camera 100. The digital video camera 100 uses a CMOS image sensor 140 to capture an object image formed by an optical system 110 including one or more lenses. The image data generated by the CMOS image sensor 140 is subjected to various processes by an image processing section 160, and stored in a memory card 200. The configuration of the digital video camera 100 will now be described in detail.

The optical system 110 has a group of lenses, including a zoom lens and a focus lens. By moving the zoom lens along the optical axis, it is possible to enlarge/shrink the object image. By moving the focus lens along the optical axis, it is possible to adjust the focus of the object image. Note that while three lenses are shown in FIG. 1 as an example, the number of lenses of the optical system 110 is appropriately determined in accordance with the required functionality.

A lens driving section 120 drives various lenses included in the optical system 110. The lens driving section 120 includes, for example, a zoom motor for driving the zoom lens and a focus motor for driving the focus lens.

A diaphragm 250 adjusts the size of the opening, thereby adjusting the amount of light to pass therethrough, in accordance with the user settings or automatically.

A shutter 130 blocks light from entering the CMOS image sensor 140.

The CMOS image sensor 140 captures an object image formed by the optical system 110 to generate image data. The CMOS image sensor 140 performs various operations, such as exposure, transfer, electronic shutter, etc. The CMOS image sensor 140 generates new image data at intervals of a certain amount of time.

An A/D converter (ADC) 150 is a circuit for converting analog image data generated by the CMOS image sensor 140 to digital image data.

In the present embodiment, a plurality of elements including the optical system 110, the diaphragm 250, the shutter 130, the CMOS sensor 140 and the ADC 150 together form an image capturing section 400. The image capturing section 400 generates and outputs digital moving picture data including a plurality of contiguous frames.

The image processing section 160 performs various processes on the image data generated by the CMOS image sensor 140, to generate image data to be displayed on a display monitor 220, and image data to be stored in the memory card 200. For example, the image processing section 160 performs various processes, such as gamma correction, white balance correction, defect correction, etc., on the image data generated by the CMOS image sensor 140. The image processing section 160 compresses image data generated by the CMOS image sensor 140 in accordance with a compression scheme, etc., in conformity with the H.264 standard, the MPEG2 standard, or the like. The image processing section 160 can be implemented by a digital signal processor (DSP), a microcomputer, or the like, for example.

The image processing section 160 can calculate the motion vector based on the image data (frame) generated by the CMOS image sensor 140. Then, the image processing section 160 can generate an interpolation frame image by motion compensation based on the calculated motion vector and the frame image associated with the motion vector. Alternatively, the image processing section 160 can generate an interpolation frame through averaging by adding together a plurality of correlated frame images at a predetermined ratio without using motion compensation. The details of the process of generating these interpolation frames will be described later.

A controller 180 controls the entire digital camera. The controller 180 can be implemented by a semiconductor device, or the like. The controller 180 may be implemented only by hardware, or may be implemented by a combination of hardware and software. The controller 180 can be implemented by, for example, a microcomputer, or the like. Alternatively, it may be implemented by a single semiconductor chip, together with the image processing section 160, etc.

A buffer 170 serves as a work memory of the image processing section 160 and the controller 180. The buffer 170 can be implemented by, for example, a DRAM, a ferroelectric memory, or the like.

A card slot 190 is capable of receiving the memory card 200, and can be mechanically and electrically connected to the memory card 200. The memory card 200 includes therein a flash memory, a ferroelectric memory, or the like, and can store data such as an image file generated by the image processing section 160.

An internal memory 230 is, for example, a flash memory, or a ferroelectric memory. The internal memory 230 stores a control program, etc., for controlling the entire digital video camera 100. The control program is executed by the controller 180.

An operating portion 210 generally refers to a user interface via which user operations are accepted. The operating portion 210 includes, for example, a cross-shaped key, an OK button, and the like, via which user operations are accepted.

The display monitor 220 is capable of displaying an image (through image) represented by image data generated by the CMOS image sensor 140, and an image represented by image data read out from the memory card 200. The display monitor 220 can also display various menu screens, etc., used for changing various settings of the digital video camera 100.

A gyrosensor 240 detects a shake in the yawing direction and a movement in the pitching direction based on the angular change over unit time, i.e., the angular velocity, of the digital video camera 100. The gyrosensor 240 outputs a gyro signal, representing the detected amount of movement, to the controller 180.

Note that the configuration described above is merely an example, and the digital video camera 100 may have any configuration as long as the image processing section 160 can perform an operation to be described below.

[1-3. Operation]

Figure 2:
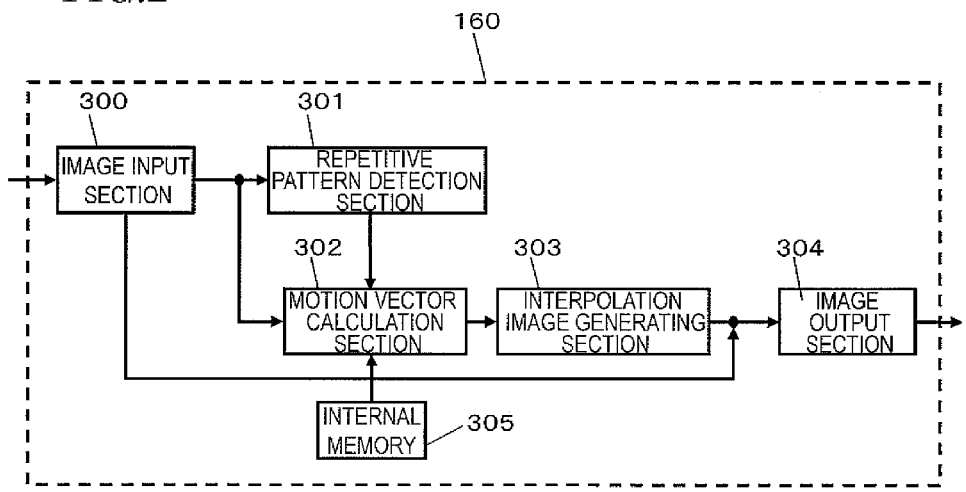
FIG. 2 is a block diagram showing a configuration of an image processing section of the digital video camera according to example Embodiment 1.

Now, an operation of the digital video camera 100 according to the present embodiment will be described. The digital video camera 100 of the present embodiment has the function of generating, from a first frame and a second frame contiguous in time with each other, an interpolation frame to be inserted between the first frame and the second frame. FIG. 2 is a block diagram showing a configuration of the image processing section 160 for realizing the operation described above of the digital, video camera 100 according to the present embodiment.

The image processing section 160 includes: an image input section 300 for receiving moving picture data output from the image capturing section 400; a repetitive pattern detection section 301 for detecting whether a repetitive pattern is included in each of the frames of the moving picture data; a motion vector calculation section 302 for calculating a motion vector between two contiguous frames; an interpolation frame generation section 310 for generating an interpolation frame to be inserted between two frames; an image output section 304 for outputting, to the outside, the moving picture data which has been interpolated with the interpolation frame; and an internal memory 305 for storing various information. These elements may be implemented by individual circuit blocks physically separated from one another, or may be implemented by a processor provided in the image processing section 160 executing programs defining the processes of the elements.

The repetitive pattern detection section 301 detects whether a repetitive pattern is included in the image represented by each frame and, if a repetitive pattern is included, measures the repetition cycle thereof. The motion vector calculation section 302 calculates a motion vector by performing a matching operation between the first and second frames contiguous with each other. An interpolation image generating section 303 generates an interpolation frame based on the calculated motion vector.

The operation of the digital video camera 100 during the shooting will now be described.

When the power is turned ON, the controller 180 supplies power to various sections of the digital video camera 100. The digital video camera 100 can be switched between the shooting mode and the playback mode by a user operation, or the like. After power is supplied, if the digital video camera 100 has been set in the shooting mode, the controller 180 initializes the optical system 110, the CMOS image sensor 140, etc., to set up the camera ready for shooting. Upon completing the setup operation for shooting, the controller 180 controls the CMOS image sensor 140 to capture an image, instructs the image processing section 160 so as to convert the image signal, which has been converted by the A/D converter 150 to a digital signal, to a signal that can be displayed as the through image, and performs a control so that the generated through image is displayed on the display monitor 220. By looking at the through image displayed on the display monitor 220, the user can check the angle of view, the object, etc., during the shooting. The user can depress a movie recording button (a part of the operating portion 210) at any point in time to instruct the controller 180 to record a moving picture. Upon receiving an instruction to record a moving picture, the controller 180 processes the image being captured by the CMOS image sensor 140 as a moving picture in a format in conformity with a predetermined standard, and starts recording the processed moving picture data on the memory card 200. On the other hand, the user can depress the movie recording button at any point in time during the movie recording operation to instruct the controller 180 to end the moving picture recording operation.

With the digital video camera 100, it is possible to change the frame rate of the moving picture captured during the movie recording operation. The time when the frame rate is changed may be, for example, when a user gives an instruction, when information (e.g., brightness information) obtained from the captured image is changed, or when a predetermined mode (e.g., a low-speed image capturing mode) is selected. Alternatively, a change of the frame rate may be programmed in advance.

When the frame rate needs to be changed, the image processing section 160 generates an interpolation frame image be inserted between frame images. The process of generating the interpolation frame image by the image processing section 160 will now be described.

FIG. 3 is a flow chart showing the interpolation frame image generating process performed by the image processing section 160. First, the image input section 300 successively obtains frame images output from the image capturing section 400 (step S301). The frame images obtained by the image input section 300 are sent to the repetitive pattern detection section 301, the motion vector calculation section 302, and the image output section 304.

For each of the frame images successively input from the image input section 300, the repetitive pattern detection section 301 detects whether a repetitive pattern, such as a fence, a lattice or a checker pattern, is present in an object included in the frame image. The repetitive pattern detection section 301 detects the width (repetition cycle) of the repetitive pattern (step S302). The details of the repetitive pattern detection process and the repetition cycle detection process will be described later. Information representing the presence/absence of a repetitive pattern and the repetition cycle thereof is sent to the motion vector calculation section 302.

The motion vector calculation section 302 determines a search range for a motion vector, based on information from the repetitive pattern detection section 301 representing the presence/absence of a repetitive pattern (step S303). If the information from the repetitive pattern detection section 301 indicates the presence of a repetitive pattern, the motion vector calculation section 302 sets a first search range as the search range for a motion vector of an object between first and second frames contiguous with each other (step S304). If the information from the repetitive pattern detection section 301 indicates the absence of a repetitive pattern, the motion vector calculation section 302 sets a second search range different from the first search range as the search range for a motion vector of an object between first and second frames contiguous with each other (step S305). Note that the details of the first search range and the second search range will be described later.

Through a process to be described later, motion vectors between two contiguous ones of the frames successively received from the image input section 300 are successively calculated within the first search range or the second search range (step S306). Information representing the calculated motion vector is sent to an interpolation image generating section 303.

Then, the interpolation image generating section 303 generates an interpolation frame in accordance with the motion vector calculation result (step S307). Finally, the image output section 304 inserts an interpolation frame between two contiguous frames and outputs the resultant data to the outside of the image processing section 160 (step S308).

The processes will now be described in detail.

Figure 4A:
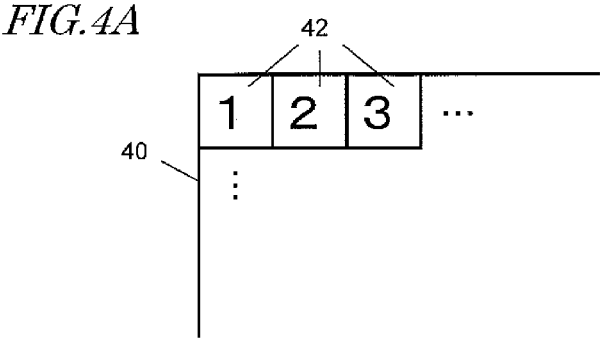
FIG. 4A is a diagram showing that each frame is divided into a plurality of macroblocks to be processed in order to detect a repetitive pattern.
Figure 4B:
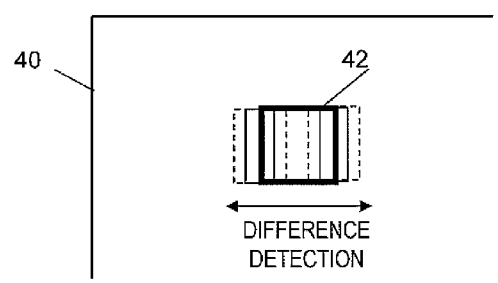
FIG. 4B is a diagram showing an operation of detecting a repetitive pattern with one macroblock shifting in the horizontal direction.
Figure 4C:
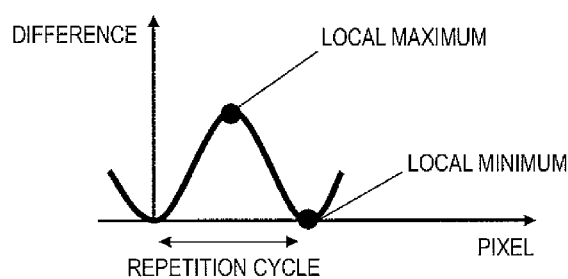
FIG. 4C is a graph showing the relationship of a difference evaluation value (SAD) with respect to the shift amount for one macroblock.

FIGS. 4A to 4C are diagrams illustrating specific examples of how the presence of a repetitive pattern is detected by the repetitive pattern detection section 301, and how the repetition cycle is detected. As shown in FIG. 4A, each frame 40 input to the repetitive pattern detection section 301 is processed by the unit of macroblocks 42 each including 16 pixels×16 pixels, for example. The repetitive pattern detection section 301 detects a repetitive pattern repeating in the horizontal direction by comparing each of the macroblocks 42 of the frame image with another block of 16 pixels×16 pixels that is shifted by pixels in the horizontal direction as shown in FIG. 4B. The difference is evaluated in terms of an evaluation function such as SAD (Sum of Absolute Difference) or SSD (Sum of Squared Difference). Although not shown in the figures, the repetitive pattern detection section 301 detects a repetitive pattern repeating in the vertical direction by comparing each of the macroblocks of the frame image with another block of 16 pixels×16 pixels that is shifted by pixels in the vertical direction. FIG. 4C is a graph plotting an example of the difference (SAD) obtained by shifting one macroblock by pixels in the horizontal direction. If a repetitive pattern is present in the frame being processed currently, a wave-shaped SAD plot with a local maximum value and a local minimum value is obtained as shown in FIG. 4C. The repetitive pattern detection section 301 detects, as the width (repetition cycle) of the repetitive pattern, the distance (unit: pixels) from the center position of the macroblock being processed to the pixel position at which SAD takes the local minimum value. On the other hand, if no repetitive pattern is present in the frame being processed currently, a wave-shaped SAD with a local maximum value and a local minimum value as shown in FIG. 4C is not obtained. That is, the repetitive pattern detection section 301 detects whether a repetitive pattern is present in the image represented by the frame being processed based on whether there is obtained a wave-shaped SAD with a local maximum value and a local minimum value as shown in FIG. 4C.

In the present specification, a "repetitive pattern" refers to a pattern by which a unit pattern within a portion of an image repeats itself in one direction with a constant cycle. Herein, "a unit pattern within a portion of an image" means a pattern that is identified by the pixel values (brightness values, or values of a specific color component) of a plurality of pixels that are contained in a partial region of an image. More specifically, evaluation values (SAD, SSD, or the like) are determined of a block which is defined by a plurality of pixels that are contained in a partial region of an image, a block which is arrived at through a displacement of this block by a certain distance in one direction, and anywhere in between. If a waveform of the changing evaluation values relative to the amount of displacement contains at least one local maximum and at least one local minimum, this pattern is regarded as a "repetitive pattern". As used herein, a "local maximum" does not mean just any local maximum, but exclusively refers to a local maximum that is greater than a predetermined reference value. Similarly, a "local minimum" does not mean just any local minimum, but exclusively refers to a local minimum that is smaller than a predetermined reference value. The reference values for the local maximum and the local minimum are to be appropriately determined in accordance with the required performance. The predetermined reference value for the local minimum may be set to a value near "0", but does not need to be "0".

Figure 5A:
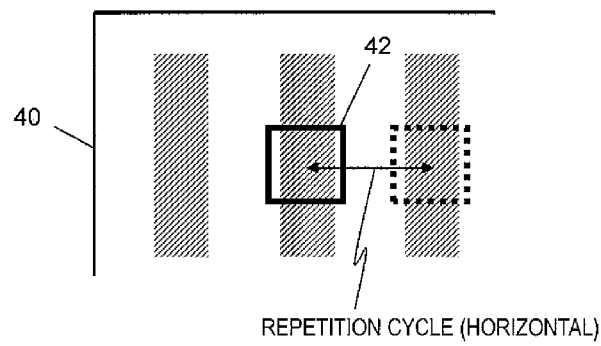
FIG. 5A is a diagram showing an example of a repetitive pattern repeating in the horizontal direction.

FIGS. 5A to 5D are diagrams showing specific examples where a repetition cycle is detected. FIG. 5A shows an example where an object having a repetitive pattern repeating in the horizontal direction (e.g., a fence) is present in the frame. In this example, a wave-shaped evaluation function similar to that shown in FIG. 4C is obtained by calculating an evaluation function such as SAD while moving the macroblock in the horizontal direction. Referring to FIG. 5A, when the macroblock is shifted to the position indicated by a dotted line from the position indicated by a solid line, the local minimum value of the difference is obtained. In this case, the amount of shift is detected as the repetition cycle in the horizontal direction.

Figure 5B:
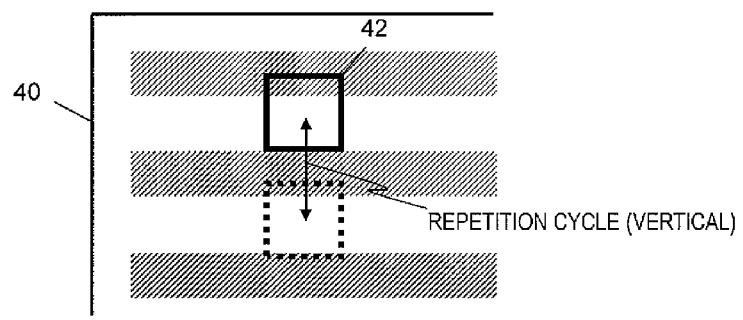
FIG. 5B is a diagram showing an example of a repetitive pattern repeating in the vertical direction.

FIG. 5B shows an example where an object having a repetitive pattern repeating in the vertical direction is present in the frame. In this example, a wave-shaped evaluation function similar to that shown in FIG. 4C is obtained by calculating an evaluation function such as SAD while moving the macroblock in the vertical direction. Also in FIG. 5B, when the macroblock is shifted to the position indicated by a dotted line from the position indicated by a solid line, the local minimum value of the difference is obtained. In this case, the amount of shift is detected as the repetition cycle in the vertical direction.

Figure 5C:
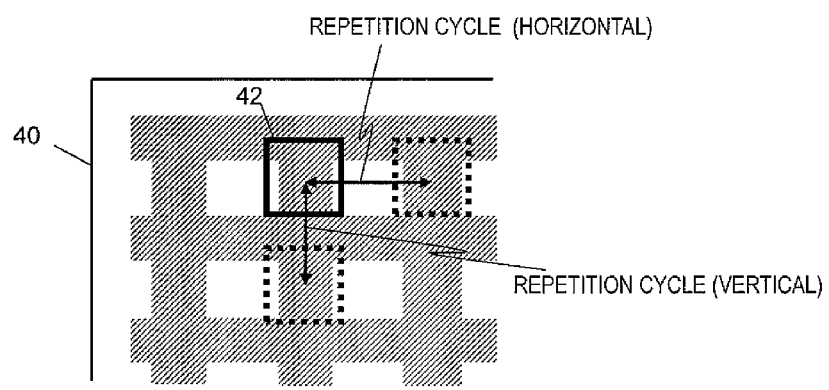
FIG. 5C is a diagram showing an example of a repetitive pattern repeating in the horizontal direction and in the vertical direction.

FIG. 5C shows an example where an object having a repetitive pattern repeating in the horizontal direction and in the vertical direction (e.g., a checker pattern) is present in the frame. In this example, a wave-shaped evaluation function similar to that shown in FIG. 4C is obtained for both of the horizontal direction and the vertical direction by calculating an evaluation function such as SAD while moving the macroblock in the horizontal direction and in the vertical direction. Also in FIG. 5C, when the macroblock is shifted to the position indicated by a dotted line from the position indicated by a solid line, the local minimum value of the difference is obtained. In this case, the amounts of shift are detected as the repetition cycle in the horizontal direction and that in the vertical direction.

Figure 5D:
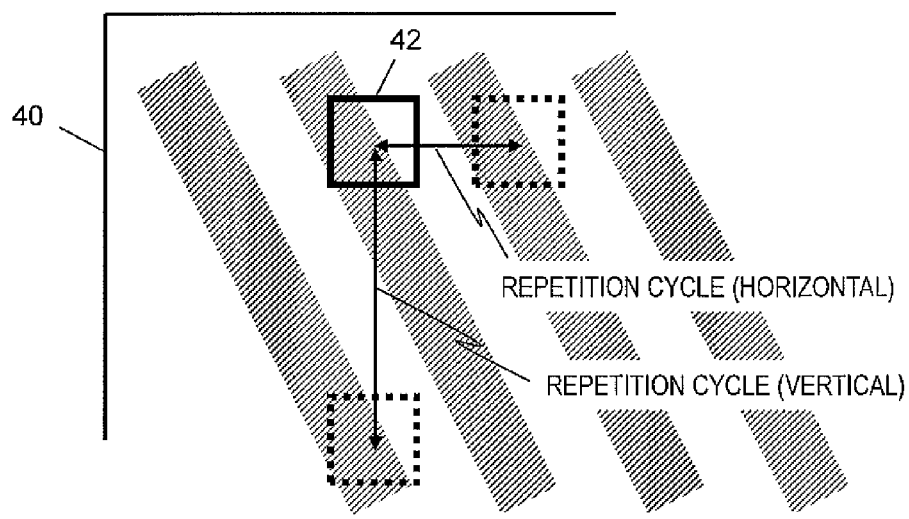
FIG. 5D is a diagram showing an example of a repetitive pattern repeating in a diagonal direction.

FIG. 5D shows an example where an object having a repetitive pattern repeating in a diagonal direction is present in the frame. Also in this example, a wave-shaped evaluation function similar to that shown in FIG. 4C is obtained for both of the horizontal direction and the vertical direction by calculating an evaluation function such as SAD while moving the macroblock in the horizontal direction and in the vertical direction. Also in FIG. 5D, when the macroblock is shifted to the position indicated by a dotted line from the position indicated by a solid line, the local minimum value of the difference is obtained. In this case, the amounts of shift are detected as the repetition cycle in the horizontal direction and that in the vertical direction.

Now, a specific example of a motion vector search and calculation operation performed by the motion vector calculation section 302 will be described. The motion vector calculation section 302 obtains frames contiguous in time with each other from the image input section 300. The motion vector calculation section 302 detects the direction and the magnitude of the motion vector by the unit of macroblocks each including 16 pixels×16 pixels, for example, for the first and second frames contiguous in time with each other. Specifically, the difference (e.g., SAD) is successively calculated by comparing a macroblock in one of the first and second frames contiguous in time with each other with another block of 16 pixels×16 pixels obtained by shifting the macroblock by pixels, within the first search range or the second search range mentioned with reference to FIG. 3, from the pixel position in the other frame corresponding to this macroblock in the horizontal direction and in the vertical direction.

Where SAD is used as the evaluation function, the motion vector $(dx(x,y),dy(x,y))$ at the coordinate position $(x,y)$ on the image is determined by obtaining dx and dy that minimize the evaluation function $P1(x,y,dx,dy)$ represented by Expression 1 below. Herein, the size of the macroblock, calculated in the number of pixels, in the horizontal direction (the x direction) of the image and that in the vertical direction (the y direction) are denoted as Bx and By, respectively. Of the two frames to be compared with each other, the pixel value (the brightness value or the value of a particular color component) of the preceding frame is denoted as L1, and that of the following frame as L2.

$$P1(x, y, dx, dy) = \qquad \text{(Expression 1)}$$

$$\sum_{i=-Bx/2}^{Bx/2} \sum_{j=-By/2}^{By/2} |L1(x+i, y+j) - L2(x+dx+i, y+dy+j)|$$

On the other hand, where SSD is used as the evaluation function, the motion vector (dx(x,y),dy(x,y)) at the coordinate position (x,y) on the image is determined by obtaining dx and dy that minimize the evaluation function P2(x,y,dx,dy) represented by Expression 2 below.

$$P2(x, y, dx, dy) = \qquad \text{(Expression 2)}$$

$$\sum_{i=-Bx/2}^{Bx/2} \sum_{j=-By/2}^{By/2} (L1(x+i, y+j) - L2(x+dx+i, y+dy+j))^2$$

By using an evaluation function represented by Expression 1 or 2, the motion vector calculation section 302 can calculate the motion vector (dx(x,y),dy(x,y)) for each macroblock.

Now, the details of the first search range and the second search range will be described.

First, the first search range will be described. The first search range is a search range for a motion vector that is set when a repetitive pattern is present in a frame image. The first search range is set so as to be less than or equal to the repetition cycle in the first direction (e.g., the horizontal direction of the image) in which the pattern repeats. The first search range may be further limited so as to be less than or equal to the repetition cycle in the second direction (e.g., the vertical direction of the image) different from the first direction in which the pattern repeats. For example, where the repetition cycle in the horizontal direction of the image is 30 pixels and the repetition cycle in the vertical direction of the image is 40 pixels, the first search range may be 20 pixels in the horizontal direction of the image and 30 pixels in the vertical direction of the image.

If the detection result from the repetitive pattern detection section 301 indicates that a repetitive pattern is present in at least one of the first and second frames, the motion vector calculation section 302 sets the first search range as the search range for a motion vector, and searches for and calculates a motion vector within the search range which has been set.

Figure 6A:
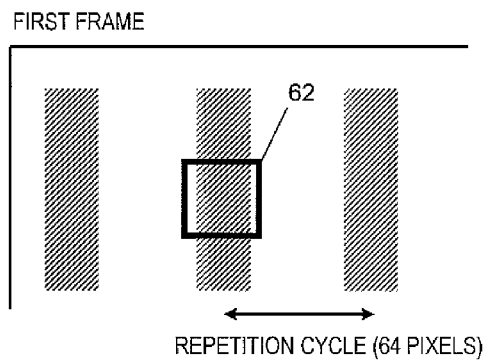
FIG. 6A is a diagram showing an example of a first frame having a repetitive pattern therein.
Figure 6B:
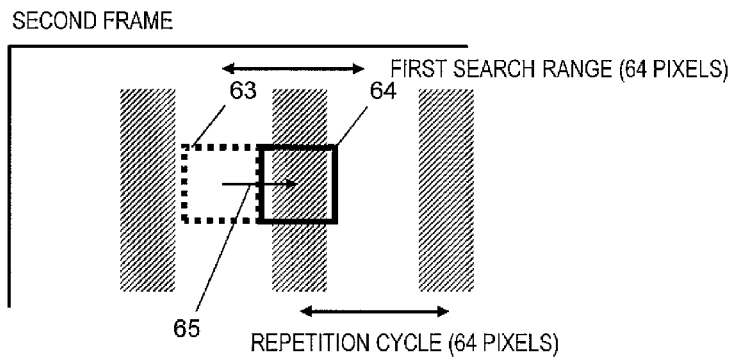
FIG. 6B is a diagram showing an example of a first search range of a second frame having a repetitive pattern therein.

Referring to. FIGS. 6A and 6B, how a motion vector is searched for within the first search range will be described. FIG. 6A shows an example of a first frame having a repetitive pattern whose repetition cycle in the horizontal direction is 64 pixels. FIG. 6B shows an example of a second frame following the first frame. As compared with the image of the first frame, the image of the second frame is shifted to the right by 32 pixels (i.e., half the cycle) in the horizontal direction of the image. As shown in FIG. 6B, the motion vector calculation section 302 performs a pattern matching operation while shifting the macroblock in the horizontal direction of the image from an area 63 indicated by a broken line in the second frame, which corresponds to the pixel position of a macroblock 62 in the first frame. A range of 64 pixels, which is equal to the cycle of the repetitive pattern, has been set as the first search range. Within the first search range, the pattern matches at an area 64 indicated by a solid line in FIG. 6B, yielding the minimum SAD. An arrow 65 of FIG. 6B represents the motion vector whose magnitude is 32 pixels and whose direction is the rightward direction in the horizontal direction. Thus, where a repetitive pattern is present in the frame image, it is possible to reliably finds and calculates a motion vector if the search range for a motion vector is less than or equal to the cycle of the repetitive pattern.

Figure 6C:
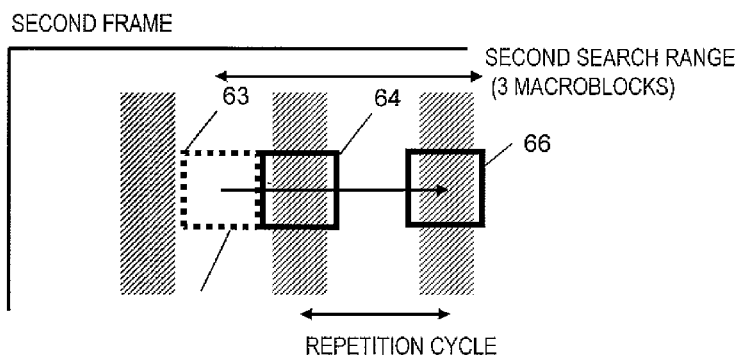
FIG. 6C is a diagram showing an example of a second search range of a second frame having a repetitive pattern therein.

Now, the reason why the search range for a motion vector is limited so as to be less than or equal to the cycle of the repetitive pattern if a repetitive pattern is present in the frame image will be described. Where a repetitive pattern, such as a fence or a lattice, is present in the frame, there is a high possibility that there are a plurality of pixel positions in the frame at which the SAD is at minimum within the search range for a motion vector, making it difficult to properly calculate the motion vector. This will be discussed in detail referring to FIG. 6C. FIG. 6C shows an example where the search range for a motion vector is not limited to be less than or equal to the cycle of the repetitive pattern, for a second frame following the first frame having a repetitive pattern whose repetition cycle is 64 pixels shown in FIG. 6A. As compared with the image of the first frame, the image of the second frame is shifted by 32 pixels (i.e., half the cycle) in the horizontal direction of the image. The search range for a motion vector shown in FIG. 6C is three macroblocks (accounting for 48 pixels). With such a search range, the pattern matches, yielding the minimum SAD, at solid-line areas 64 and 66, resulting in two pixel positions in the frame at which SAD is at minimum. This is because the search range for a motion vector is not limited to be less than or equal to the repetition cycle of the repetitive pattern in the frame.

With the digital video camera 100 of the present embodiment, where the detection result from the repetitive pattern detection section 301 indicates that a repetitive pattern is present in the frame, as shown in FIG. 6B, the motion vector calculation section 302 sets the search range so as to be less than or equal to the repetition cycle detected by the repetitive pattern detection section 301 at least for the direction in which the pattern is repeating. Thus, since the motion vector calculation section 302 searches for a motion vector within the range equal to the cycle of the repetitive pattern, there is only a small possibility that there are a plurality of pixel positions in the frame within the search range for a motion vector at which SAD is at minimum, allowing for a more accurate calculation of a motion vector.

Next, the second search range will be described. The second search range is a search range for a motion vector that is set if no repetitive pattern is present in the frame image. The internal memory 305 has, stored therein in advance, information representing search ranges for a motion vector. In the present embodiment, as a predetermined search range for a motion vector, the internal memory 305 stores, for example, information representing a search range extending over three macroblocks left and right in the horizontal direction of the image and two macroblocks up and down in the vertical direction of the image. The second search range is set based on information stored in the internal memory 305 representing a search range for a motion vector.

If the detection result from the repetitive pattern detection section 301 indicates that a repetitive pattern is absent in either one of the first and second frames, the motion vector calculation section 302 sets the second search range as the search range for a motion vector, and finds and calculates a motion vector within the search range which has been set.

Figure 7A:
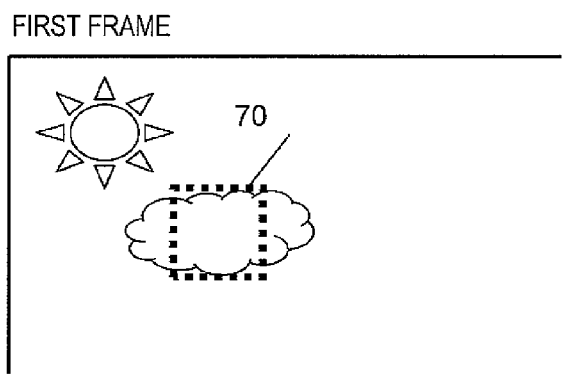
FIG. 7A is a diagram showing an example of a first frame having no repetitive pattern therein.
Figure 7B:
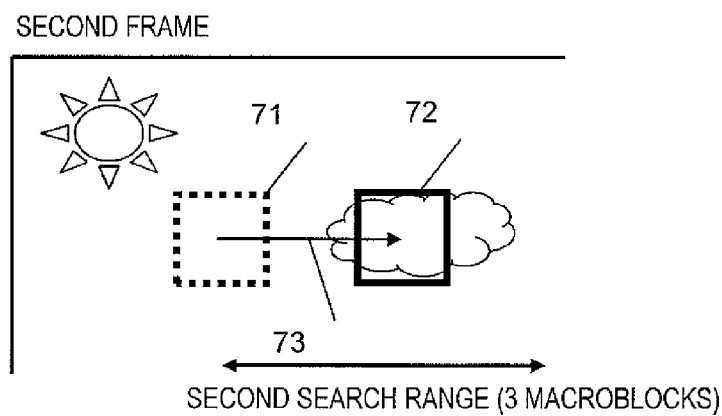
FIG. 7B is a diagram showing an example of a second frame having no repetitive pattern therein.

Referring to FIGS. 7A and 7B, how a motion vector is searched for within the second search range will be described. FIG. 7A shows an example of a first frame having no repetitive pattern. FIG. 7B shows an example of a second frame following the first frame. As compared with the image of the first frame, the image of the second frame is shifted by 32 pixels in the horizontal direction of the image. As shown in FIG. 7B, the motion vector calculation section 302 performs a pattern matching operation while shifting the macroblock in the horizontal direction of the image from an area 71 indicated by a broken line in the second frame, which corresponds to the pixel position of a macroblock 70 in the first frame. The internal memory 305 stores information representing a search range extending over three macroblocks as a search range in the horizontal direction of the image. Therefore, the second search range in the horizontal direction is set to be three macroblocks. Within the second search range, the pattern matches at an area 72 indicated by a solid line in FIG. 7B, yielding the minimum SAD. An arrow 73 of FIG. 7B represents the motion vector whose magnitude is 32 pixels and whose direction is the rightward direction in the horizontal direction.

Note that while the predetermined search range for a motion vector is determined by the unit of macroblocks in the present embodiment, the present disclosure is not limited thereto. That is, the predetermined search range for a motion vector may be determined by the unit of pixels, and it does not need to be limited to any particular search range for a motion vector. Note however that where the search range for a motion vector is limited, it is possible to find and calculate a motion vector within a predetermined search range at a higher speed as compared with a case where the search range is not limited to any particular search range.

To summarize, the operation of the motion vector calculation section 302 is as follows. The motion vector calculation section 302 calculates the difference while gradually shifting pixels in the first search range or the second search range. Then, the motion vector calculation section 302 identifies the distance and the direction (the horizontal component and the vertical component) from the pixel corresponding to the center position of the macroblock being processed to the position of the pixel at which the difference takes the local minimum. Through the process described above, the motion vector calculation section 302 calculates the motion vector by performing a matching operation between the first and second frames within the search range determined based on the detection result from the repetitive pattern detection section 301.

Referring back to FIG. 2, the motion vector calculation section 302 sends frame images contiguous in time with each other obtained from the image input section 300 and the detected motion vector to the interpolation image generating section 303. The motion vector calculation section 302 sends the motion vector detected for each of the macroblocks of the frame being processed to the interpolation image generating section 303.

The interpolation image generating section 303 shifts an image represented by the macroblock which was being processed when calculating a motion vector from one of the first and second frames contiguous in time with each other to an intermediate position of the motion vector in accordance with the detected motion vector (motion-compensated interpolation). By similarly performing motion-compensated interpolation for all the macroblocks of the frame, the interpolation image generating section 303 generates an interpolation frame image to be inserted between the first and second frames contiguous in time with each other. Note that the interpolation frame image does not always have to be a frame of an intermediate state, as long as it is a frame representing a transitional state between the two contiguous frames generated based on the motion vector.

The interpolation image generating section 303 sends the generated interpolation frame image to the image output section 304. The image output section 304 successively inserts interpolation frame images between corresponding frame images contiguous in time with each other (between the first and second frames), and outputs the resultant data. Through these processes, the image processing section 160 can output a moving picture whose frame rate has been changed.

[1-4. Advantageous Effects, etc.]

As described above, in the present embodiment, the image processing section 160 includes: the repetitive pattern detection section 301 for detecting whether a repetitive pattern is present in at least one of the first and second frames; the motion vector calculation section 302 for calculating a motion vector by performing a matching operation between first and second frames within a search range. (the first search range and the second search range different from the first search range) determined based on the detection result from the repetitive pattern detection section 301; and the interpolation image generating section 303 for generating an interpolation frame in accordance with the motion vector calculation result. Thus, it is possible to switch between different search ranges when a repetitive pattern is present in the frame and when no repetitive pattern is present in the frame, and calculate a correct motion vector. Therefore, even if the frame rate is changed to a higher frame rate, it is possible to display a moving picture of a higher image quality on the display monitor.

The repetitive pattern detection section 301 further detects a repetition cycle in accordance with the repetitive pattern detection result. The first search range is determined so as to be less than or equal to the repetition cycle in the first direction in which the pattern repeats (e.g., the horizontal direction and/or the vertical direction of the image). Thus, since a motion vector is searched for within the range equal to the cycle of the repetitive pattern, there is only a small possibility of an erroneous detection of a motion vector, allowing for an accurate calculation of a motion vector.

The image processing section 160 further includes the internal memory 305 for storing information representing the search range for a motion vector. The second search range is set based on the information stored in the internal memory 305.

Moreover, the motion vector calculation section 302 calculates a motion vector while limiting the search range to be less than or equal to the repetition cycle in the second direction (e.g., the, vertical direction of the image) different from the first direction in which the pattern repeats (e.g., the horizontal direction of the image). Thus, since a motion vector is searched for within the range equal to the cycle of the repetitive pattern in the horizontal direction and the vertical direction of the image, there is only an even smaller possibility of an erroneous detection of a motion vector, allowing for a more accurate calculation of a motion vector.

The motion vector calculation section 302 divides each of the first and second frames into a plurality of portions, and performs a matching operation between the first and second frames for each of the divided portions to calculate the motion vector for the portion. The interpolation image generating section 303 generates the interpolation frame based on the motion vector calculated for each of the portions. Thus, it is possible to realize an interpolation process that reflects the motion of an object for each portion of the frame, and it is possible to generate a more appropriate interpolation frame.

(Other Embodiments)

Embodiment 1 has been described above as an example of the technique disclosed in the present application. However, the technique of this disclosure is not limited thereto, but is also applicable to other embodiments in which changes, replacements, additions, omissions, etc., are made as necessary. Different ones of the elements described in Embodiment 1 above may be combined together to obtain a new embodiment.

In view to this, other embodiments are illustrated hereinbelow.

The CMOS image sensor 140 is illustrated as an image capturing means in the embodiment above, but the image capturing means is not limited thereto. For example, the image capturing means may be implemented by a CCD image sensor or an NMOS image sensor.

The image processing section 160 and the controller 180 may be implemented by a single semiconductor chip, or by separate semiconductor chips.

The repetitive pattern detection is performed by the method of obtaining the difference (SAD) while shifting the macroblock by pixels in the embodiment above, but the technique of the present disclosure is not limited thereto. Methods other than this are also applicable as long as it is possible with the methods to detect the presence/absence of a repetitive pattern and to detect the width of repetition.

The repetitive pattern detection section 301 detects a repetitive pattern for the horizontal direction and for the vertical direction in the embodiment above, but the embodiment is not limited thereto. For example, the repetitive pattern detection section 301 may be configured to detect a repetitive pattern for one of the horizontal direction and the vertical direction or for a diagonal direction.

The embodiment above is directed to an example where the technique of the present disclosure is applied to the digital video camera 100 (image capturing apparatus). However, the application of the technique of the present disclosure is not limited to the image capturing apparatus, but the technique is also applicable to an image processing apparatus capable of serving as the image processing section 160 described above, for example. The configuration of such an image processing apparatus is similar to that shown in FIG. 2, for example, and the operation thereof is similar to that shown in FIG. 3, for example. For example, the image processing apparatus can obtain data of a moving picture that has been generated by a video camera and stored in a storage medium at a later point in time, and insert an interpolation frame through the process described above to store the resultant data as another piece of moving picture data.

While the interpolation image generating section 303 generates, from first and second frames contiguous in time with each other, an interpolation frame to be inserted between the first and second frames, the present disclosure is not limited thereto. The interpolation image generating section 303 may generate, from a plurality of frames contiguous in time with each other, e.g., first, second, third and fourth frames contiguous in time with each other, an interpolation frame to be inserted between the second and third frames.

The technique of the present disclosure may be further applicable to software (program) that defines the interpolation frame generating process described above. The operation defined by such a program is as shown in FIG. 3, for example. Such a program may be provided while being stored in a portable storage medium, or may be provided through a telecommunications network. With a processor provided in a computer executing such a program, it is possible to realize the various operations described in the embodiment above.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The application of the present disclosure is not limited to the digital video camera 100. That is, the present disclosure is applicable image processing apparatuses capable of converting the frame rate, such as digital still cameras and information terminals equipped with cameras.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-002733 filed Jan. 11, 2012, and No. 2013-000799 filed Jan. 8, 2013, the entire contents of which are hereby incorporated by reference.

What is claimed is:

1. An image processing apparatus for generating an interpolation frame that is inserted between a first frame and a second frame of a moving picture contiguous with each other, the image processing apparatus comprising:

a repetitive pattern detection section configured to detect whether a repetitive pattern is present in at least one of the first and second frames;

a motion vector calculation section configured to calculate a motion vector by performing a matching operation between the first and second frames within a search range determined according to a detection result from the repetitive pattern detection section; and an interpolation frame generation section configured to generate the interpolation frame in accordance with a calculation result of the motion vector.

2. The image processing apparatus of claim 1, wherein the motion vector calculation section sets a first search range as the search range when the detection result from the repetitive pattern detection section indicates that the repetitive pattern is present in at least one of the first and second frames, and the motion vector calculation section sets a second search range different from the first search range as the search range when the detection result from the repetitive pattern detection section indicates that the repetitive pattern is absent in either one of the first and second frames.

3. The image processing apparatus of claim 2, wherein:

the repetitive pattern detection section further detects a repetition cycle based on the detection result from the repetitive pattern; and the first search range is determined so as to be less than or equal to a repetition cycle in a first direction in which the pattern repeats.

4. The image processing apparatus of claim 3, further comprising a storage section configured to store information representing the search range for a motion vector,
wherein the second search range is set based on the information.

5. The image processing apparatus of claim 3, wherein the motion vector calculation section calculates the motion vector while further limiting the search range so as to be less than or equal to a repetition cycle of the repetitive pattern in a second direction different from the first direction.

6. The image processing apparatus of claim 5, wherein the first direction is a horizontal direction of an image represented by each frame, and the second direction is a vertical direction of an image represented by each frame.

7. The image processing apparatus of claim 1, wherein:
the motion vector calculation section divides each of the first and second frames into a plurality of portions, and performs a matching operation between the first and second frames for each of the divided portions to calculate the motion vector for the portion; and
the interpolation frame generation section generates the interpolation frame based on the motion vector calculated for each of the portions.

8. An image capturing apparatus comprising:
the image processing apparatus of claim 1; and
an image capturing section configured to generate data of a moving picture including the first and second frames through a shooting.

9. A computer program, stored on a non-transitory computer-readable medium, for use in an image processing apparatus for generating an interpolation frame that is inserted between a first frame and a second frame of a moving picture contiguous with each other, the computer program instructing a computer of the image processing apparatus to execute the steps of:
detecting whether a repetitive pattern is present in at least one of the first and second frames;
calculating a motion vector by performing a matching operation between the first and second frames within a search range determined according to a detection result from the repetitive pattern detection section; and
generating the interpolation frame in accordance with a calculation result of the motion vector.

* * * * *